Feb. 27, 1951  W. S. SHULTZ  2,543,732
MOMENTUM GAUGE PISTON STOP
Filed May 27, 1949

Inventor
WILLIAM S. SHULTZ

By
Attorney

Patented Feb. 27, 1951

2,543,732

UNITED STATES PATENT OFFICE 2,543,732

MOMENTUM GAUGE PISTON STOP

William S. Shultz, Woods Hole, Mass., assignor, by mesne assignments, to the United States of America as represented by the Secretary of the Navy Application May 27, 1949, Serial No. 95,808

1 Claim. (Cl. 73—35)

This invention relates to measuring and testing instruments, and more particularly to a piston construction for momentum gauges utilized in measuring shock waves resulting from the detonation of explosive materials under water.

Figure 1:
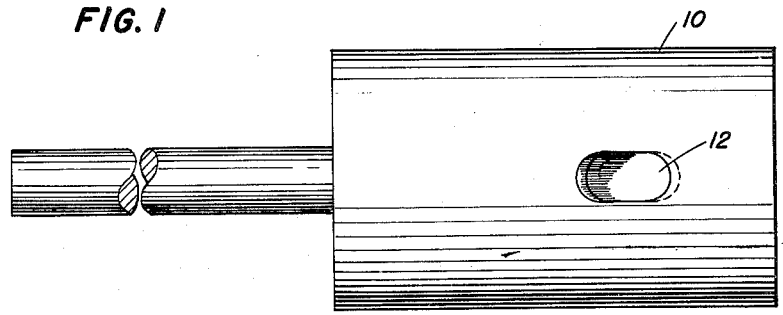
Figure 2:
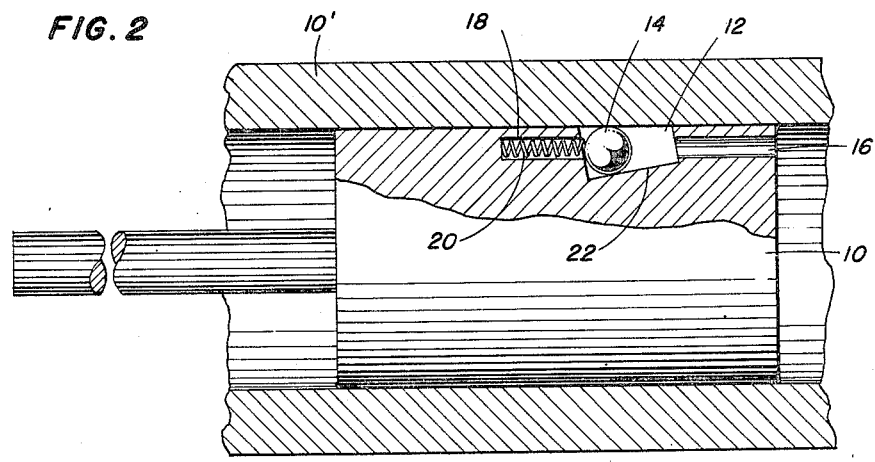

An object of the invention is to improve the operation of a piston in a cylinder for purposes such as are required in making momentum gauges, and to devise means for controlling the movement of a piston so that it may be prevented from moving other than in one direction. The above and other objects will appear from the following description, taken in conjunction with the accompanying drawing, in which:

Fig. 1 is a view in side elevation of a piston member constructed in accordance with the invention; and Fig. 2 is a view partly in section and partly broken away, and showing the piston of Fig. 1 in an operative position within a portion of a testing instrument.

In measuring shock waves with momentum gauges, a piston member is caused to move against a copper sphere by reason of the force of an explosion which is being measured under water. The impact of the piston produces a measurable change in the copper sphere which serves as a basis for calculating the magnitude of the explosion. It will be apparent that if the movement of the piston against the copper sphere is repeated accidentally, an erroneous determination may result.

In accordance with the invention, I have constructed an improved momentum gauge piston in which means are provided for preventing the piston from falling back and striking the copper sphere a second time.

Referring more in detail to the drawings, 10 denotes a piston member such as is commonly employed in momentum gauges. Formed in the side of the piston is a slot 12 which is preferably elongated as shown in Fig. 1, and which has a bottom surface disposed at an angle to the axis of the piston. At its right-hand side, as viewed in Figs. 1 and 2, the slot is relatively shallow so that a ball 14 supported in the slot would project outwardly beyond the periphery of the piston. As the slot extends along the piston, it gradually increases in depth as is more clearly shown in Fig. 2, until the depth of the slot exceeds the diameter of ball 14.

At one side of the slot 12 is a trip hole 16 communicating with the shallow end of the slot and with the right end surface of the piston, so as to provide means for contacting the ball from outside of the piston to dislodge the ball from the shallow end of the slot. At the opposite side of the slot, there is formed an opening 18 in which is located a spring member 20, as shown in Fig. 2. Numeral 22 denotes a spring steel insert which is mounted at the bottom of the slot.

In operation, the piston moves in a direction from left to right as viewed in Fig. 2, within a test instrument, a portion of which is shown at 10', and during such passage the ball member 14 assumes a position such as that shown in Fig. 2 in which little interference with the periphery of a cylinder occurs. When movement of the piston stops, however, the spring member 20 urges the ball forwardly into a position in which it projects beyond the peripheral wall of the piston and tends to engage with an adjacent cylinder surface. Any tendency for the piston to move in a direction from right to left, as viewed in the drawings, then causes the ball to jam or lock between the relatively shallow end of the slot and the cylinder wall, thus effectually preventing any movement or dropping back of the piston. When it is desired to release the piston from the locked position, this may be done by dislodging the ball 14 through the trip hole 16.

By this arrangement it is possible to eliminate any secondary impacts of a momentum gauge piston against the elements with which it cooperates, for example, a copper sphere, and a more dependable reading is thus provided for. It may be desired, however, to employ the piston stop construction with other types of gauges and mechanisms where it is desired temporarily to check movement of a piston in one direction in the manner common to momentum gauges. Similarly, the means for locking the piston may take various forms and shapes, both with respect to the slot, the ball, and the resilient means for urging the ball into the relatively shallow end of the slot. A plurality of slots and balls could be used, if desired.

While I have shown a preferred embodiment of my invention, it should be understood that various changes and modifications may be resorted to, in keeping with the spirit of the invention as defined in the appended claim.

I claim:

In a testing instrument, a piston having a slot extending longitudinally therein, said slot having a bottom surface disposed at an angle to the axis of the piston, a locking element movably mounted in said slot and dimensioned with relation to the dimension of the slot so as to lie wholly within the slot when the element is at the deep end of the slot and to extend beyond the peripheral surface of the slot when in the shallow end of the slot, and biasing means urging said element toward the shallow end of the slot, said piston having an opening providing communication between the shallow end of the slot and an end surface of the piston to facilitate dislodging of the element from the shallow end of the slot.

WILLIAM S. SHULTZ.

REFERENCES CITED

The following references are of record in the file of this patent:

UNITED STATES PATENTS

| Number | Name | Date |
|---|---|---|
| 1,523,290 | Rimailho | Jan. 13, 1925 |
| 2,029,016 | Cadmus | Jan. 28, 1936 |

FOREIGN PATENTS

| Number | Country | Date |
|---|---|---|
| 23,646 | Great Britain | Nov. 16, 1905 |